United States Patent [19]

Ireland

[11] 4,064,736

[45] Dec. 27, 1977

[54] METHOD AND APPARATUS FOR MEASURING PERFORMANCE TIMES OF A SHUTTER APPARATUS

[76] Inventor: Tracy Ireland, 1203 S. Tyler, Loveland, Colo. 80537

[21] Appl. No.: 728,763

[22] Filed: Oct. 1, 1976

[51] Int. Cl.² .............................................. G04F 7/10
[52] U.S. Cl. ........................................................ 73/5
[58] Field of Search ................. 73/5; 356/28; 324/181

[56] References Cited

U.S. PATENT DOCUMENTS

| | | | |
|---|---|---|---|
| 3,603,133 | 9/1971 | Westhaver | 73/5 |
| 3,913,376 | 10/1975 | Scott | 73/5 |

*Primary Examiner*—Donald O. Woodiel

*Attorney, Agent, or Firm*—Bruce G. Klaas

[57] ABSTRACT

A method and apparatus for measuring times for leading and trailing curtains of a camera shutter apparatus to traverse a focal plane aperture, an exposure time determined by the initial width between the two curtains, a photoflash delay time measured between the time the leading curtain begins the traverse and the time a photoflash apparatus is energized, and a change in exposure time between the beginning and the end of the traverse of the curtains. The invention may also measure certain bladed type shutter apparatus performance time characteristics. The invention involves a display means for displaying the times measured and a selection means for selecting among the various times measured for display.

25 Claims, 4 Drawing Figures

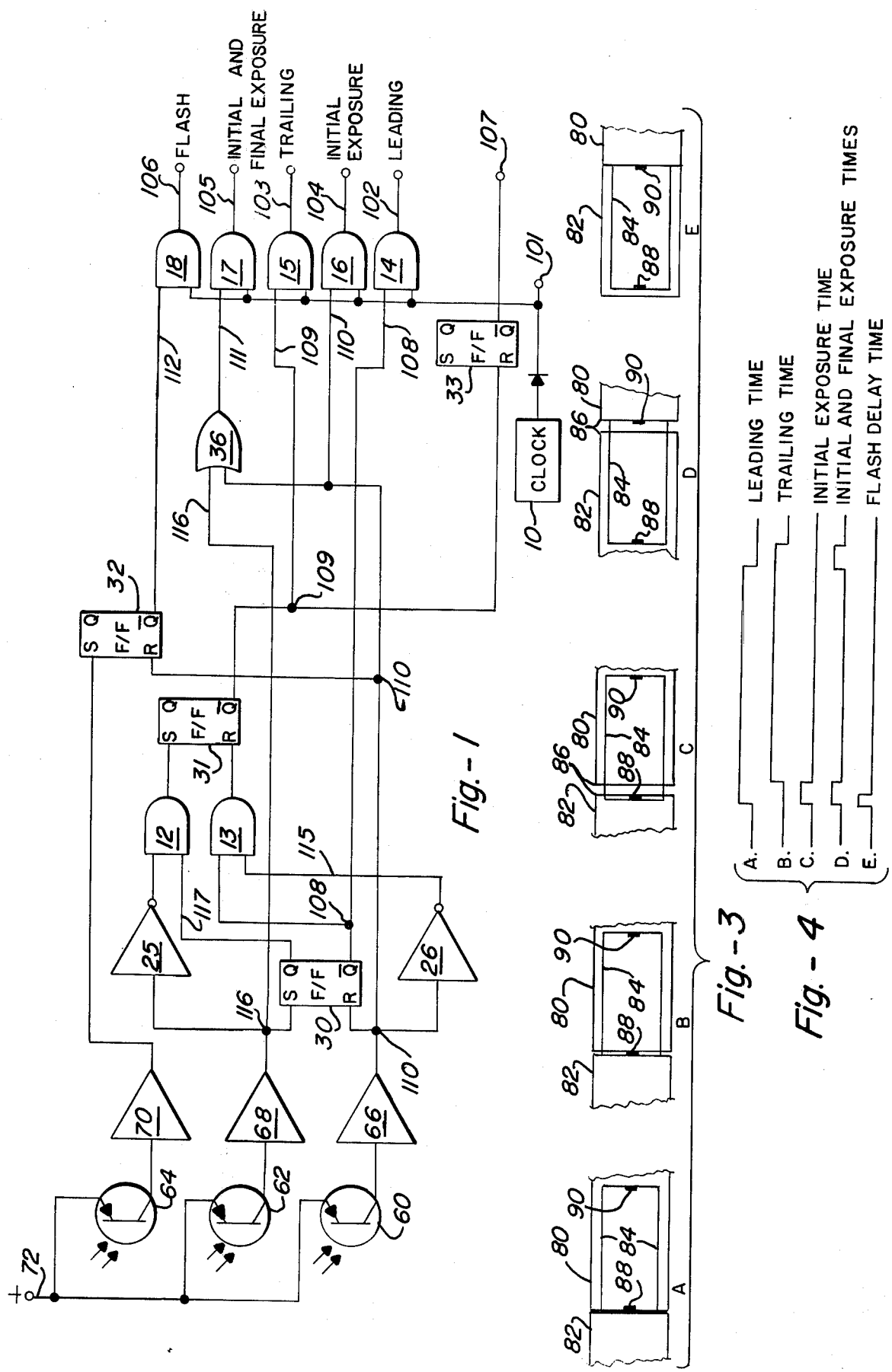

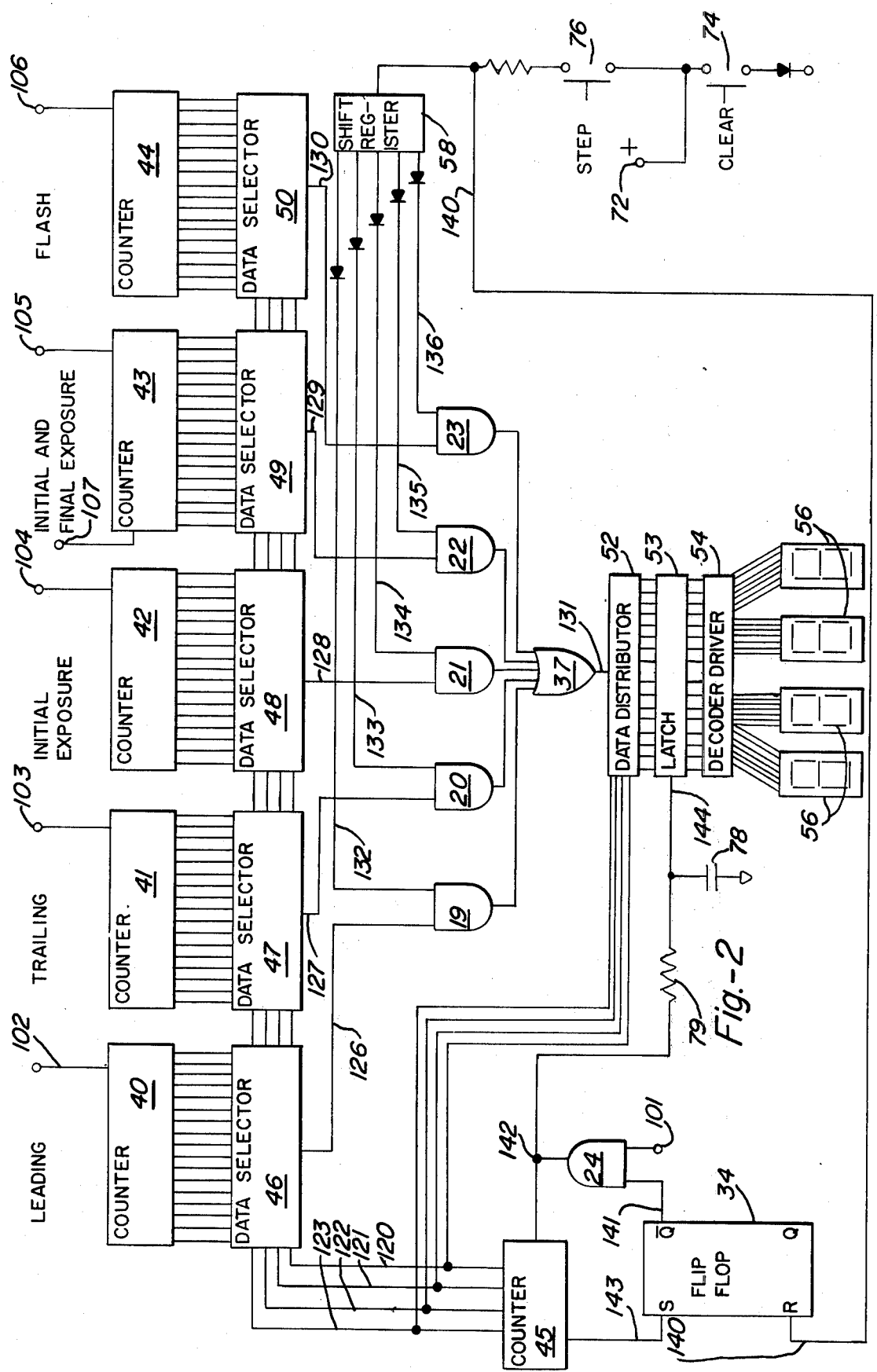

METHOD AND APPARATUS FOR MEASURING PERFORMANCE TIMES OF A SHUTTER APPARATUS

BACKGROUND AND SUMMARY OF THE INVENTION

The present invention generally relates to cameras, and more particularly to a method and apparatus for measuring various performance time characteristics of a camera shutter apparatus. Proper operation and adjustment of the shutter apparatus of the camera is critical in obtaining the correct exposure conditions for the film. Insufficient, or improper, or non-uniform exposure of the film will result in poor photographs. After periods of prolonged use and possible rough handling, the performance characteristics of the shutter apparatus may change; consequently, it is the usual practice to check and readjust the shutter apparatus to obtain the desired performance characteristics.

Presently, a variety of different measuring devices for determining the shutter speeds and exposure times of cameras are known, but the known devices suffer from one or more deficiencies. The typical measuring device provides only one measurement of the exposure, usually in terms of a percentage of change from a desired amount. This single exposure measurement generally makes it difficult to adjust a shutter apparatus of the type having leading and trailing curtains which traverse a focal plane aperture. In such shutter apparatus the exposure time is determined by the width of a slit between the curtains and the speed in which the curtains traverse the aperture. If each curtain traverses the focal plane at a different speed, the exposure time from one point to another across the focal plane aperture changes, since the width of the slit between the curtain changes. Consequently, one objective in obtaining relatively uniform exposure time is to cause both curtains to traverse the focal plane aperture in approximately the same time or at the same speed. If the exposure time is improper, one or the other of the leading or trailing curtains must be adjusted, but without measurements of the actual times for the leading and trailing curtains to traverse the focal plane aperture, it is difficult to adjust the curtains properly.

Another problem with known measuring devices is the impossibility of determining the exposure conditions from one point to the next across the focal plane, usually at the beginning and at the end of the traverse. In some relatively sophisticated cameras, the exposure width is designed to be different at the beginning and at the end of the traverse to compensate for an acceleration or a rapid burst of speed of the curtains at the start of the traverse. The initial burst of speed of the curtains requires a wider slit between the curtains at the beginning of the traverse and a gradually narrower slit at the end to obtain uniform exposure at the focal plane. A compensation or braking device is typically used to vary the width of the exposure slit, by reducing the speed and narrowing the exposure width after the traverse starts, and measuring this change in exposure time is important in properly adjusting the compensation or braking device. Known measurement devices do not provide any indication in the change in exposure time.

Known measuring devices supply an indication of the degree of synchronization between a desired photoflash delay and the actual photoflash delay of a certain camera. The synchronization indication does not provide an actual measurement of the delay time period, which makes rapid adjustment of the camera's photoflash delay difficult.

It is a general object of the present invention to overcome the foregoing described deficiencies of known measurement devices for camera shutter apparatus, and to completely measure all relevant performance times associated with curtain type shutter apparatus. More directly, the objectives of the present invention involve obtaining accurate and complete measurements of the leading and trailing curtain traverse times, of an initial exposure time, of a photoflash delay time, and of a change in exposure time at the beginning and the end of the traverse of the curtains of the focal plane aperture. Other objectives of the invention relate to measuring the operational characteristics more completely and accurately for all types of shutter apparatus. Still other objectives of the invention relate to collecting complete data on the performance characteristics of the shutter apparatus from one operation of the shutter apparatus and retaining the data for repeated selection and display. Other features of the invention relate to various improvements in shutter performance measuring apparatus, including the use of relatively inexpensive electronic elements arranged for obtaining very accurate measurements and for direct display of the performance time characteristics measured.

In accordance with the present invention, the invention may generally be summarized as comprising various measuring means for measuring an elapsed time for the leading curtain to traverse the focal plane aperture, for measuring an elapsed time for the trailing curtain to traverse the focal plane aperture, and for measuring a time period between the time that the leading curtain starts the traverse and the time that the trailing curtain starts the traverse. A display means is operative for displaying the times measured. Also included are measuring means for measuring a time delay between the time that the leading curtain starts the traverse and the time of energization of a photoflash apparatus controlled by the camera, and measuring means for measuring a change in exposure time at the start and at the end of the traverse of the curtains. The apparatus of the present invention may include digital circuit elements, a clock for providing pulses at predetermined fractions of seconds to count the times measured, and a means for selecting certain of the times measured for display. The method of the present invention includes measuring the elapsed time for the leading curtain to traverse the focal plane aperture, measuring an elapsed time for the trailing curtain to traverse the focal plane aperture, and measuring an initial exposure time. The method may also include measuring a time delay for the energization of the photoflash apparatus and measuring a change in exposure time as the curtains traverse the focal plane aperture. The invention is also applicable to measuring performance characteristics of various shutter apparatus, including blade type shutter apparatus.

A more complete understanding of the invention, as well as other objectives and features may be obtained from the following detailed description of the invention and from the brief description of the drawing.

BRIEF DESCRIPTION OF THE DRAWINGS

FIG. 1 is a schematic diagram of a first portion of a preferred embodiment of the apparatus of the present invention.

FIG. 2 is a schematic diagram of remaining apparatus used in conjunction with the apparatus of FIG. 1 to complete an embodiment of the present invention.

FIGS. 3A to 3E are diagrammatic illustrations of curtain type shutter apparatus, of exemplary positions of the curtain type shutter apparatus as it traverses a focal plane aperture, and of positions of certain apparatus used in conjunction with FIG. 1.

FIGS. 4A to 4E are timing diagrams illustrating the operation of a certain portion of the apparatus of FIGS. 1 and 2 and the shutter apparatus of FIGS. 3A to 3E.

DETAILED DESCRIPTION OF THE INVENTION

A presently preferred embodiment of the invention generally comprises a method and apparatus for measuring performance time characteristics of a shutter apparatus. The performance time measuring apparatus may take the form of various measuring means for measuring the performance times and may generally comprise the electronic elements shown in FIGS. 1 and 2, including a clock 10, AND gates 12 to 24, invertors 25 and 26, flip flops 30 to 34, OR gates 36 to 37, counters 40 to 45, data selectors 46 to 50, a data distributor 52, a latch 53, a decoder driver 54, a desired number of seven segment displays 56, and a shift register 58. In addition to the foregoing digital circuit elements, there are also included a plurality of phototransistors 60, 62 and 64; amplifiers 66, 68 and 70; a terminal 72 for the connection of a conventional power supply means (not shown) for supplying suitable electrical power to the circuit; switches 74 and 76; and a capacitor 78 and resistor 79.

The performance times measured for curtain type shutter apparatus by the method and apparatus of the present invention include, according to different embodiments, an elapsed time for a leading curtain to traverse a focal plane aperture, an elapsed time for a trailing curtain to traverse the focal plane aperture, a time period between the time that the leading curtain starts the traverse of the focal plane aperture and the time that the trailing curtain starts the traverse of the focal plane aperture, a time delay between the time that the leading curtain starts the traverse of the focal plane aperture and the time of energization of a photoflash apparatus controlled by an energizing means of the camera, and the time period between the time that the leading curtain ends the traverse of the focal plane aperture and the time that the trailing curtain ends the traverse of the focal plane aperture.

The performance of curtain type shutter apparatus can be understood by reference to FIGS. 3A to 3E which show a leading curtain 80, a trailing curtain 82, and a focal plane aperture 84. The leading curtain and trailing curtain traverse the focal plane aperture at different times providing a slit 86 therebetween for exposing the film (not shown). The width of the slit 86 and the speed of the curtains 80 and 82 determine the exposure conditions as the curtains move from left to right in FIG. 3. As shown in FIG. 3B, the leading curtain 80 is first released and begins its traverse across the focal plane aperture 84. In FIG. 3C the trailing curtain 82 is next released and begins its traverse. The slit 86 between the leading and trailing curtains causes exposure of the film, FIGS. 3C and 3D. The leading curtain 80 ends its traverse, FIG. 3D, and the trailing curtain ends its traverse in FIG. 3E, thus terminating the exposure operation. The initial exposure width or time is illustrated by slit 86 in FIG. 3C and final exposure width or time is illustrated by slit 86 in FIG. 3D, and the initial and final exposures may change between the beginning and end of the traverse of the curtains 80 and 82 across the focal plane aperture 84. An energization device of the camera for energizing a photoflash apparatus energizes the photoflash apparatus a short time after the leading curtain 80 begins its traverse in FIG. 3B, causing light to be emitted at some point before the full initial exposure is attained as shown in FIG. 3C. Timing diagrams corresponding to the described performance time characteristics are shown in FIGS. 4A to 4E.

Although primarily discussed in conjunction with curtain type shutter apparatus, it will be apparent to persons skilled in the art and from certain of the appended claims, that the present invention is not intended to be limited in use to cameras with curtain type shutter apparatus, but also may be used with other types of shutter apparatus, including blade type shutter apparatus, although all of the previously described performance data may not be obtainable with certain other types of shutter apparatus.

When using apparatus of the present invention, the back cover of the camera is opened and means 88 and 90 for providing light communication paths to the phototransistors 60 and 62, respectively, are located adjacent the edges of the focal plane aperture 84. Means 88 are located at a position adjacent the edge of the focal plane aperture from which the curtains begin their traverse. This position is generally that position at which light will first pass through the shutter apparatus at the beginning of the exposure opening, and this position may vary with different types of shutter apparatus. Means 90 are located at a position adjacent the edge of the focal plane aperture at which the curtains end their traverse. This position is generally that position for various types of shutter apparatus at which the beginning of the end of a full exposure opening occurs, as shown in FIG. 3D for curtain type apparatus. Means 88 and 90 may be apparatus for mounting the phototransistors 60 and 62 adjacent the edges of the focal plane aperture, or may include a variety of mechanical means such as light optic fibers.

Referring now to FIGS. 1 and 2, the apparatus of the present invention may generally include a clock means such as clock 10 for providing clock pulses at a predetermined frequency, preferably 1 KHz; photoelectric sensor means such as phototransistors 62, 64 and 66 for providing an electrical signal during exposure to light; gating means such as the other elements illustrated in FIG. 1 for conducting clock pulses in accordance with electrical signals from the phototransistors; counter means such as counters 40 to 44 for counting the clock pulses conducted by the gating means and for providing outputs indicative of the count preferably in numbers of fractions of seconds according to the frequency of the clock; and display means such as the seven segment displays 56 for displaying numbers indicative of the output count supplied by the counter means.

The operation of various measuring means for measuring performance times of a curtain type shutter apparatus will now be described in conjunction with FIGS. 1 and 2. Prior to an exposure operation of the shutter apparatus, switch 74 is closed to set flip flops 30 to 34 to a high output at their Q terminals and to clear counters 40 to 45. In FIG. 1, clock 10 supplies clock pulses on conductor 101 to one input of each of the AND gates 14 to 18, but the clock pulses are not coupled through the AND gates on conductors 102 to 106 until a high level signal is applied on conductors 108 to 112, respectively, to the other input of AND gates 14 to 18. As will be described more fully, the high inputs on conductors 108 through 112 correspond to the timing diagrams of FIGS. 4A to 4E, respectively.

When the leading curtain 80 initially starts its traverse of the focal plane aperture (FIG. 3B), means 88 is exposed to light biasing phototransistor 60 causing a high output from amplifier 66 on conductor 110. The high level on conductor 110 brings the $\overline{Q}$ output of flip flop 30 high causing the level on conductor 108 to be high. AND gate 14 is biased conductive and clock pulses are conducted on conductor 102. Simultaneously, since conductor 110 is high, AND gate 16 also begins conducting clock pulses from conductor 104. The high signal on conductor 110 is also coupled through OR gate 36 on conductor 111 causing AND gate 17 to begin conducting clock pulses on conductor 105. The high level on conductor 110 causes the $\overline{Q}$ output of flip flop 32 to go high, and the high signal on conductor 112 causes AND gate 18 to begin coupling clock pulses on conductor 106. Thus, it can be seen that when the leading curtain first starts to move and opens the focal plane aperture for the transmission of light, a timing sequence is begun for timing the traverse time of the leading curtain by pulses on conductor 102, an initial exposure time by pulses on conductor 104, an exposure time for comparing the initial and final exposure time by pulses on conductor 105, and a flash delay time by pulses on conductor 106.

At some point before a full exposure width is obtained, the energization means of the camera causes the photoflash apparatus to be energized. Means for providing a light communication path from the photoflash apparatus to the phototransistor 64, such as a mounting apparatus for phototransistor 64 in front of the photoflash apparatus, (not shown), causes the phototransistor 64 to be biased conductive when the photoflash is energized. The signal from phototransistor 64 is amplified to a high level by amplifier 70 and applied to flip flop 32, causing its $\overline{Q}$ output to go low. The low $\overline{Q}$ output of flip flop 32 is applied on conductor 112 to AND gate 18, thus terminating the conduction of clock pulses by AND gate 18 on conductor 106 in accordance with the timing diagram of FIG. 4E. Thus, a measurement of a flash delay time is provided by a number of pulses which were coupled through AND gate 18 on conductor 106, each pulse representing a predetermined fraction of a second of time measured, preferably in numbers of one thousandths of seconds.

When a full initial exposure width or slit 86 is obtained (FIG. 3C), phototransistor 60 is no longer biased by light coming throuh the focal plane aperture since the trailing curtain 82 has begun to move and has blocked means 88. The non-conductivity of phototransistor 60 causes amplifier 66 to provide a low level on conductor 110 which terminates the conduction of clock pulses by AND gate 16 on conductor 104. Thus, a measurement of the initial exposure time as shown in FIG. 4C is provided by the number of clock pulses which were conducted on conductor 104 between the time that the leading curtain began its traverse and the time that the trailing curtain began its traverse of the focal plane aperture. The low level on conductor 110 causes OR gate 36 to terminate the high level on conductor 111 to AND gate 17, and pulses corresponding to the initial exposure time applied on conductor 105 are terminated. Thus, it can be seen that when the trailing curtain starts its traverse of the focal plane aperture, the initial exposure time is determined for purposes of comparing the initial exposure time to the ending exposure time, according to the pulses on conductor 105. The low level on conductor 110 is also inverted by invertor 26 and applied to one input of AND gate 13 on conductor 115. The level on conductor 108 remains high since the state of flip flop 30 has not changed, and the two high inputs to AND gate 13 cause the $\overline{Q}$ output of flip flop 31 to go high, thereby providing a high level signal on conductor 109. The high level on conductor 109 causes AND gate 15 to begin conducting clock pulses on conductor 103, thereby initiating the measurement of the time for the trailing curtain to traverse the focal plane aperture. The high level on conductor 109 also causes the $\overline{Q}$ output of flip flop 33 to go high thereby causing conductor 107 to be high. The high level on conductor 107 is used in conjunction with the clock pulses appearing on conductor 105 to determine the change in exposure time at the beginning and end of the traverse as will become more apparent from the subsequent description, and it should be noted that the level on conductor 107 only becomes high after the initial exposure time has been determined.

The leading and trailing curtains continue to traverse the focal plane aperture until the leading curtain has completed its traverse and exposed means 90 to light (FIG. 3D). Means 90 biases phototransistor 62 and the high output of amplifier 68 is applied on conductor 116. The high level on conductor 116 causes the Q output of flip flip 30 to become high, thereby causing its $\overline{Q}$ output to go low on conductor 108 and terminate the conduction of clock pulses by AND gate 14 on conductor 102. This terminates the measurement of the leading curtain traverse time of the focal plane aperture. The high level on conductor 116 is also coupled through OR gate 36 on conductor 111 causing AND gate 17 to again begin conducting clock pulses on conductor 105 to begin a determination of the final exposure time or width 86 as the curtains end the traverse of the focal plane aperture.

When the trailing curtain 82 finishes its traverse of the focal plane aperture, (FIG. 3E) means 90 is blocked and phototransistor 62 is no longer biased. The resulting low level from amplifier 68 on conductor 116 is coupled through OR gate 36 on conductor 111 causing AND gate 17 to terminate the conduction of clock pulses on conductor 105. Thus, a measurement of the final exposure time or width at the end of the curtain traverse has been provided on conductor 105. The low level on conductor 116 is also inverted by invertor 25 and both inputs to AND gate 12 are high, since the level on conductor 117 remains high after flip flop 30 was initially set when the means 90 was first exposed to light. The high output from AND gate 12 is applied to flip flop 31 causing the $\overline{Q}$ output to go low on conductor 109, thus terminating the conduction of clock pulses by AND gate 15 on conductor 103. The termination of clock pulses on conductor 103 completes the measurement of the time for the trailing curtain 82 to traverse the focal plane aperture.

The clock pulses representing the performance time data measured appearing on conductors 102 through 106 are applied to the counters 40 to 44, respectively, of FIG. 2. At the end of an exposure operation, counter 40 has counted the number of clock pulses representing the numbers of one thousandths of a second required for the leading curtain to traverse the focal plane aperture. Counter 41 has counted a number of pulses representing the time for the trailing curtain to traverse the focal plane aperture. Counter 42 has counted the number of pulses representing the initial exposure time and counter 44 has counted that number of pulses representative of the actual flash delay time. Counter 43 is an up-down counter, and has received pulses on conductor 105 representing the initial exposure width at which time the level on conductor 107 was held low causing counter 43 to count upward. When the level on conductor 107 is high, after the previously described determination of the initial exposure time, the pulses received on conductor 105 cause the counter 43 to count down. In effect, the operation of counter 43 is a subtraction means for subtracting the pulses representative of the initial exposure width or time from the pulses representative of the final exposure width, thereby providing a measurement of the change or difference in exposure time between the beginning and the end of the curtain traverse of the focal plane.

A switching or selection means connected between the counters 40 to 44 and the display 56 for selectively switching the outputs from the counters to the display means will now be described. The performance time data measurements of counters 40 to 44 appear in binary coded digit form on the sixteen output conductors of the counters and are applied to data selectors 46 to 50, respectively. A closure of switch 76 momentarily provides a high signal on conductor 140 which causes shift register 58 to provide a high signal on one of the conductors 132 to 136, and causes a high signal on conductor 141 from the $\overline{Q}$ output of flip flop 34. Clock pulses from conductor 101 are coupled through AND gate 24 to conductor 142 and applied at input to counter 45, as long as the $\overline{Q}$ output level on conductor 141 from flip flop 34 remains high. Counter 45 supplies binary coded signals on conductors 120 through 123 in accordance with the count of clock pulses coupled through AND gate 24 on conductor 142. At the end of sixteen counts, a high level signal is supplied from the carry output of counter 45 on conductor 143 to the set input of flip flop 34, causing the Q output to go high and the $\overline{Q}$ output to go low. The low level on conductor 141 to AND gate 24 terminates the conduction of clock pulses to conductor 142, thus ending further binary incrementation on conductors 120 to 123 at a zero count. The binary coded count, when present, on conductors 120 to 123, is applied to each of the data selectors 46 to 50 and to the data distributor 52. Closure of switch 74 resets the shift register 58 to zero and causes a low level output on conductor 141 from the $\overline{Q}$ terminal of flip flop 34.

A first closure of switch 76 will cause a display of the elasped time for the leading curtain to traverse the focal plane aperture. The first closure of switch 76 causes conductor 132 connected to the shift register 58 and conductor 141 from flip flop 34 to become high. Counter 45 begins counting and the data selectors 46 to 50 couple signals on conductors 126 to 130, respectively, representative of the levels present at their sixteen inputs in accordance with the count appearing on conductors 120 to 123, as the count addresses each of the inputs in order causing the data selectors to couple each input level to their output at conductors 126 to 130. The high level on conductor 132 from shift register 58 as a result of the first closure of switch 76 causes signals appearing on conductor 126 from the data selector 46 representative of the count in counter 40 to be coupled through AND gate 19 and to OR gate 37 to form the input on conductor 131 to the data distributor 52. The information on conductor 131 is distributed to the sixteen outputs of the data distributor 52 in accordance with the address counts on conductors 120 through 123. In this manner with each clock pulse appearing on conductor 142 and with the corresponding count signal change on conductors 120 through 123, each of the sixteen outputs from center 40 is supplied to one input of the latch 53 in order. These levels appear at the sixteen inputs to the latch 53 in synchronism with the clock pulses on conductor 101 and 142. The pulses on conductor 142 are coupled through a delay network comprising capacitor 78 and resistor 79 to slightly delay the application of a high latching signal on conductor 144 to the latch 53. The delayed latching signal ensures that an input is present at the latch 53 when the latching signal is received. After all sixteen outputs from counter 40 have been latched in latch 53, clock pulses on conductor 142 are terminated. The input signal levels to the decoder driver 54 from the latch are the same as the output signals appearing from the first counter 40. The decoder driver 54 decodes the binary coded signal levels and causes the display means 56 to register a decimal indication representative of the elapsed time for the leading curtain to traverse the focal plane aperture.

To obtain display of the elapsed time for the trailing curtain to traverse the focal plane aperture, switch 76 is depressed a second time and conductor 133 connected to shift register 58 goes high and conductor 132 goes low. Conductor 141 from the $\overline{Q}$ output of flip flop 34 goes high and clock pulses appear on conductor 142 causing counter 45 to count and begin applying address signals on conductors 120 through 123. Signals from data selector 47 are coupled through AND gate 20 to the data distributor 52 and latched in order at the latch 53 according to the pulses on conductor 144 and binary coded count signals on conductors 120 and 123. After sixteen clock pulses, the $\overline{Q}$ level of flip flop 34 has gone low and the performance time data has been latched in latch 53 which corresponds to the binary coded time measurement, as was held in counter 41. This data is decoded and applied by the decoder driver 54 to the display means 56 to supply a decimal indication of the elapsed time for the trailing curtain to traverse the focal plane aperture.

In a like manner, a third closure of switch 76 causes the initial exposure time of counter 42 to be displayed, a fourth closure of switch 76 causes the change in exposure time of counter 43 to be displayed and a fifth closure of switch 76 causes the flash time of counter 44 to be displayed. Counters 40 to 44 hold the data measured for a reasonable period of time and thus form one means for holding signals representative of the various times measured. The data selectors and distributors and switching arrangements previously described form a selecting means for selecting among the various times measured to cause a selected time measurement to be displayed.

Because the counters hold the signals for a reasonable period of time, repetitive selections of the same measurement times are available after a single exposure operation by repeated closures of switch 76.

After adjustment of the camera shutter apparatus, switch 74 may be depressed to reset all counters, flip flops and the shift register 58. Another exposure operation of the shutter apparatus may then be caused with the complete performance data measurements again being secured. Measurements of the complete performance times may be obtained after each adjustment or whenever desired.

The convenience of selecting between the various times measured allows for rapid adjustment of the camera shutter apparatus. The performance times measured are supplied by the display 56 in a manner which is easy to read and difficult to mistake. Actual times are provided as opposed to changes or percentage changes which thereby facilitate easy adjustment of the shutter apparatus. The arrangement of digital circuit elements in conjunction with the measurement by the clock pulses occurring at predetermined fractions of seconds allows a high resolution in the time measured. The apparatus is easy to operate and is comprised of relatively inexpensive and conventional elements.

While an illustrative and presently preferred embodiment of the inventive concepts has been described hereinbefore, it is to be understood that the appended claims are intended to include alternative embodiments except insofar as limited by the prior art.

What is claimed is:

1. Apparatus for electrically measuring performance times of a camera shutter apparatus of the type having a leading curtain and a trailing curtain which are caused to traverse a focal plane aperture at different times for the usual purpose of exposing film when the shutter apparatus is operated, comprising:
   first measuring means for measuring an elapsed time for a leading curtain to traverse a focal plane aperture;
   second measuring means for measuring an elapsed time for a trailing curtain to traverse the focal plane aperture;
   third measuring means for measuring a time period between the time that the leading curtain starts the traverse of the focal plane aperture and the time that the trailing curtain starts the traverse of the focal plane aperture; and
   display means operative in conjunction with the first, second and third measuring means for displaying at least one of the times measured.

2. An apparatus as recited in claim 1 further including selecting means for selecting among the various times measured to cause the selected time measurements to be displayed by the display means.

3. An apparatus as recited in claim 2 further including means for holding signals representative of the various times measured whereby the various times measured may be repeatedly selected for display after a single operation of the shutter apparatus.

4. An apparatus as recited in claim 1 further including means for determining the time difference between the time period measured by the third measuring means and the time period between the time that the leading curtain ends the traverse of the focal plane aperture and the time that the trailing curtain ends the traverse of the focal plane aperture.

5. An apparatus as recited in claim 1 wherein the camera is further of the type having a means for energizing a photoflash apparatus, and the invention further comprises:
   fourth measuring means for measuring a time delay between the time that the leading curtain starts the traverse of the focal plane aperture and the time of energization of a photoflash apparatus controlled by energizing means of the camera, and
   the display means is also operative in conjunction with the fourth measuring means.

6. An apparatus as recited in claim 5 further including selecting means for selecting among the various times measured to cause the selected time measurements to be displayed by the display means.

7. An apparatus as recited in claim 6 further including means for holding signals representative of the various times measured whereby the various times measured may be repeatedly selected for display after a single operation of the shutter apparatus.

8. An apparatus as recited in claim 5 wherein the invention further comprises:
   fifth measuring means for measuring a change in exposure time at the start and end of the traverse of the curtains across the focal plane aperture, by subtracting from the time period measured by the third measuring means the time period between the time that the leading curtain ends the traverse of the focal plane aperture and the time that the trailing curtain ends the traverse of the focal plane aperture, and
   the display means is also operative in conjunction with the fifth measuring means.

9. An apparatus as recited in claim 8 further including selecting means for selecting among the various times measured to cause the selected time measurements to be displayed by the display means.

10. An apparatus as recited in claim 9 further including means for holding signals representative of the various times measured whereby the various times measured may be repeatedly selected for display after a single operation of the shutter apparatus.

11. An apparatus as recited in claim 1 wherein the measuring means comprise:
   first and second photoelectric sensor means for providing an electrical signal during exposure to light,
   means for providing a light communication path to the first photoelectric sensor means from a position adjacent the edge of the focal plane aperture from which the curtains begin the traverse across the focal plane aperture, and
   means for providing a light communication path to the second photoelectric sensor means from a position adjacent the edge of the focal plane aperture from which the curtains end the traverse across the focal plane aperture.

12. An apparatus as recited in claim 11 wherein the measuring means further comprise:
   a clock means for providing clock pulses at a predetermined frequency,
   gating means for conducting clock pulses in accordance with the electrical signals provided from the first and second photoelectric sensor means, and
   counter means for counting the clock pulses conducted by the gating means and for providing outputs to the display means indicative of the counts.

13. An apparatus as recited in claim 5 wherein the measuring means comprise:
   first, second and third photoelectric sensor means for providing an electrical signal during exposure to light;
   means for providing a light communication path to the first photoelectric sensor means from a position adjacent the edge of the focal plane aperture from which the curtains begin the traverse across the focal plane aperture,
   means for providing a light communication path to the second photoelectric sensor means from a position adjacent the edge of the focal plane aperture from which the curtains end the traverse across the focal plane aperture, means for providing a light communication path to the third photoelectric sensor means for light provided from a photoflash apparatus controlled by the means of the camera for energizing a photoflash apparatus.

14. An apparatus as recited in claim 13 wherein the measuring means further comprise:

a clock means for providing clock pulses at a predetermined frequency, gating means for conducting clock pulses in accordance with the electrical signals provided from the first, second and third photoelectric sensor means, and counter means for counting the clock pulses conducted by the gating means and for providing outputs to the display means indicative of the counts.

15. An apparatus as recited in claim 14 further comprising switching means for selectively switching the outputs of the counter means to the display means.

16. Apparatus for electrically measuring performance times of a shutter apparatus of a camera, comprising:

first and second photoelectric sensor means for providing an electrical signal when exposed to light;

means for providing a light communication path to the first photoelectric sensor means from a position relative to the shutter apparatus at which light will first pass through the shutter apparatus at the beginning of the exposure opening;

means for providing a light communication path to the second photoelectric sensor means from a position relative to the shutter apparatus at which light will pass through the shutter apparatus at the beginning of the end of a full exposure opening;

a clock means for providing clock pulses at a predetermined frequency;

gating means, connected to the sensor means and the clock means, for conducting clock pulses in accordance with the electrical signals from the sensor means;

counter means, connected to the gating means, for counting the clock pulses conducted by the gating means and for providing outputs indicative thereof; and display means, connected to the counter means, for displaying numbers indicative of the outputs supplied by the counter means.

17. An apparatus as recited in claim 16 further including:

switching means, connected with the counter means and display means, for selectively switching outputs of the counter means to the display means.

18. An apparatus as recited in claim 16 wherein the camera also includes means for energizing a photoflash apparatus, and the invention further includes:

a third photoelectric sensor means, connected to the gating means, for providing an electrical signal when exposed to light; and means for providing a light communication path to the third photoelectric sensor means for light provided from a photoflash apparatus controlled by a means of the camera for energizing the photoflash apparatus.

19. An apparatus as recited in claim 18 further including:

switching means, connected with the counter means and display means, for selectively switching outputs of the counter means to the display means.

20. A process for measuring the performance times of a shutter apparatus of a camera of the type having a leading curtain and a trailing curtain which are caused to traverse a focal plane aperture at different times for the usual purpose of exposing film when the shutter apparatus is operated, comprising:

measuring an elapsed time for a leading curtain to traverse a focal plane aperture, measuring an elapsed time for a trailing curtain to traverse the focal plane aperture, measuring a first time period between the time that the leading curtain starts the traverse of the focal plane aperture and the time that the trailing curtain starts the traverse of the focal plane aperture, and displaying at least one of the times measured.

21. A process as recited in claim 20 for use with a camera also having means for energizing a photoflash apparatus wherein the invention further comprises:

measuring a time delay between the time that the leading curtain starts the traverse of the focal plane aperture and the time of energization of a photoflash apparatus controlled by the energizing means of the camera.

22. A process as recited in claim 21 further comprising:

measuring a second time period between the time that the leading curtain ends the traverse of the focal plane aperture and the time that the trailing curtain ends the traverse of the focal plane aperture.

23. A process as recited in claim 22 further comprising:

substracting the second time period measured from the first time period measured.

24. A process as recited in claim 20 further comprising:

measuring a second time period between the time that the leading curtain ends the traverse of the focal plane aperture and the time that the trailing curtain ends the traverse of the focal plane aperture.

25. A process as recited in claim 24 further comprising:

substracting the second time period measured from the first time period measured.

* * * * *